United States Patent [19]
Johnson et al.

[11] Patent Number: 5,870,470
[45] Date of Patent: Feb. 9, 1999

[54] METHOD AND APPARATUS FOR ENCRYPTING LONG BLOCKS USING A SHORT-BLOCK ENCRYPTION PROCEDURE

[75] Inventors: Donald Byron Johnson, Pleasant Valley; Stephen Michael Matyas, Jr., Poughkeepsie, both of N.Y.

[73] Assignee: International Business Machines Corporation, Armonk, N.Y.

[21] Appl. No.: 603,771

[22] Filed: Feb. 20, 1996

[51] Int. Cl.$^6$ .................................................. H04K 1/02
[52] U.S. Cl. ................................................. 380/6; 380/28
[58] Field of Search ............................ 380/6, 9, 29, 30, 380/37

[56] References Cited

U.S. PATENT DOCUMENTS

| | | |
|---|---|---|
| 3,956,615 | 5/1976 | Anderson et al. . |
| 5,146,500 | 9/1992 | Mauer . |
| 5,159,632 | 10/1992 | Crandall . |
| 5,271,061 | 12/1993 | Crandall . |
| 5,272,755 | 12/1993 | Miyaji et al. . |
| 5,351,297 | 9/1994 | Miyaji et al. . |
| 5,351,299 | 9/1994 | Matsuzaki et al. ................... 380/29 X |
| 5,412,729 | 5/1995 | Liu ............................................ 380/37 |
| 5,442,707 | 8/1995 | Miyaji et al. . |
| 5,511,123 | 4/1996 | Adams ....................................... 380/29 |
| 5,684,876 | 11/1997 | Pinder et al. ............................. 380/37 |
| 5,696,823 | 12/1997 | Blaze ..................................... 380/9 X |

FOREIGN PATENT DOCUMENTS 9415423  7/1994  WIPO .

OTHER PUBLICATIONS

Johnson, DB et al., "Hybrid Key Distribution Scheme Giving Key Record Recovery", vol. 37, No. 02A, Feb. 1994, pp. 5–16.

Koblitz, N, "Elliptic Curve Cryptosystems", Mathematics of Computation, vol. 48, No. 117, Jan. 1987, pp. 209–209.

Rivest, RL et al., "A Method for Obtaining Digital Signatures and Public–Key Cryptosystems", Communications of the ACM, vol. 21, No. 2, Feb. 1978, pp. 120–126.

Miller, VS, "Use of Elliptic Curves in Cryptography", Advances in Cryptology—Crypto '85, Lecture Notes in Computer Science, 218 (1986), Springer–Verlag, pp. 417–426. No month.

(List continued on next page.)

Primary Examiner—George Dombroske
Assistant Examiner—Paul D. Amrozowicz
Attorney, Agent, or Firm—W. A. Kinnaman, Jr.

[57] ABSTRACT

A system for encrypting a plaintext block using a block encryption algorithm having a block size smaller than that of the plaintext block. The plaintext block is transformed into a masked plaintext block using an invertible transformation optionally dependent on additional data and defined such that each bit of the masked plaintext block depends on every bit of the original plaintext block. A subportion of the masked plaintext block is encrypted using the encryption algorithm to generate an encrypted portion of the masked plaintext block. A ciphertext block is generated from the thus encrypted portion of the masked plaintext block and the remaining portion of the masked plaintext block. The ciphertext block is transmitted to a data recipient, who reverses the procedure to recover the original plaintext block. Since the entire masked plaintext block is necessary to reconstruct the original plaintext block and since the encrypted portion cannot be derived from the remaining portion, the remaining portion of the masked plaintext block may be transmitted to the recipient in unencrypted form. To thwart certain cryptanalytic attacks, either the plaintext block or the optional additional data is uniquely modified for each encryption of a plaintext block, using an incrementing counter, time stamp, random number or other mechanism. In an exemplary embodiment, an elliptic curve algorithm having a block size on the order of 160 bits is used to encrypt a 512-bit block containing a symmetric encryption key.

37 Claims, 5 Drawing Sheets

OTHER PUBLICATIONS

Bellare, M et al., "Optimal Asymmetric Encryption", Advances in Cryptology—Eurocrypt '94, Workshop on the Theory and Application of Crytographic Techniques, Perugia, Italy, May 9–12, 1994 Proceesings, pp. 92–111.

Kaliski, Jr., BS, "A Standard Definition for Optimal Asymmetric Encryption Padding", RSA Laboratories, Redwood City, CA, Feb. 6, 1996—Second Draft, pp. 1–15.

METHOD AND APPARATUS FOR ENCRYPTING LONG BLOCKS USING A SHORT-BLOCK ENCRYPTION PROCEDURE

BACKGROUND OF THE INVENTION

1. Field of the Invention

This invention relates to a block encryption system and more particularly to a method and apparatus for encrypting a long plaintext block using an encryption procedure intended for relatively short blocks.

1. Description of the Related Art

Encryption schemes fall into two general categories: symmetric encryption systems and asymmetric encryption systems. In symmetric encryption systems, such as those conforming to the Data Encryption Standard (DES), the same key is used by the originator to encrypt data (i.e., convert plaintext to ciphertext) and by the recipient to decrypt the same data (i.e., convert ciphertext back to ciphertext). Symmetric encryption schemes can often be implemented very efficiently, but suffer the disadvantage of requiring the prior exchange of encryption keys over a secure communications channel.

Asymmetric encryption systems, or public key encryption systems as they are usually called, use one key to encrypt data while using another key to decrypt the same data. In a public key encryption system, an intended recipient of data generates a key pair consisting of an encryption key, which is made public, and a corresponding decryption key, which is kept private and not shared with others. The keys are generated in such a manner that the private key cannot be derived from knowledge of the corresponding public key; hence, only the intended recipient having the private key decrypt a ciphertext message generated using the public key. An important advantage public key encryption systems have over symmetric systems is that they do not require the exchange of secret key information; two parties can establish a secure two-way communication by exchanging public keys that they have generated. For this reason, asymmetric encryption systems are often used for the secret key exchange required in symmetric encryption systems.

Perhaps the most well-known public key encryption system is the RSA encryption system, named after its originators and described in R. L. Rivest et al., "A Method for Obtaining Digital Signatures and Public-Key Cryptosystems", *Communications of the ACM*, vol. 21, no. 2, pp. 120–126 (1978). RSA encryption systems typically have encryption blocks on the order of 512 bits and can be computationally quite intensive. Recently, however, so-called elliptic curve systems have been described in such references as N. Koblitz, "Elliptic Curve Cryptosystems", *Mathematics of Computation*, vol. 48, no. 177, pp. 203–209 (January 1987), and A. Menezes, *Elliptic Curve Public Key Cryptosystems* (1993). Like the RSA encryption system, elliptic curve systems are public key systems with public encryption keys and private decryption keys. Elliptic curve systems typically have relatively short key and encryption block sizes, on the order of 160 bits for each, but have a cryptographic strength that is comparable to that of longer block RSA encryption systems. Elliptic curve systems thus represent an attractive combination of cryptographic strength and computational efficiency.

Since elliptic curve encryption systems are public key systems, one use of such systems might be to distribute keys. Thus, user A might use a public elliptic curve key to encrypt a symmetric key (e.g., a DES key) for distribution to user B. But a problem arises, since the symmetric key is normally contained in a key block (e.g., a 512-bit block) which is much longer than the elliptic curve encryption block, which, as noted above, may be on the order of only 160 bits. Although the key block can be divided into multiple encryption blocks of sufficiently small size, the additional encryption operations required for the individual encryption blocks vitiate to some extent the natural advantages of elliptic curve systems in terms of their computational efficiency. What is needed is a method of key encryption that can be used with an elliptic curve algorithm which will permit a large key block to be encrypted with a secret elliptic curve key of much shorter length.

SUMMARY OF THE INVENTION

One aspect of the present invention contemplates a system for encrypting a plaintext block (such as a key block) using a block encryption algorithm (such as an elliptic curve algorithm) having a block size smaller than that of the plaintext block. In accordance with this aspect of the invention, the plaintext block is transformed into a masked plaintext block using an invertible transformation optionally dependent on additional data outside the plaintext block. The additional data may comprise control information, a control vector or other information available to the recipient and not requiring encryption. The transformation is defined such that (1) the original plaintext block is recoverable from the masked key block and optional additional information and (2) each bit of the masked plaintext block depends on every bit of the original plaintext block. A subportion of the masked plaintext block is encrypted using the encryption algorithm to generate an encrypted portion of the masked plaintext block. A ciphertext block is generated from the thus encrypted portion of the masked plaintext block and the remaining portion of the masked plaintext block. The ciphertext block is transmitted to a recipient, who reverses the procedure to recover the original plaintext block.

Since the entire masked plaintext block is necessary to reconstruct the original plaintext block and since the encrypted portion cannot be derived from the remaining portion, the remaining portion of the masked plaintext block may be transmitted to the recipient in unencrypted form. The invention thus permits a long key block to be encrypted with a short encryption key. In an exemplary embodiment, an elliptic curve algorithm having a block size on the order of 160 bits is used to encrypt a 512-bit block containing a symmetric encryption key.

In accordance with another aspect of the present invention, either the plaintext block or the additional data on which the transformation is optionally dependent is uniquely modified for each encryption of a plaintext block, using an incrementing counter, time stamp, random number or other mechanism to thwart certain cryptanalytic attacks.

DESCRIPTION OF THE PREFERRED EMBODIMENTS

Figure 1:
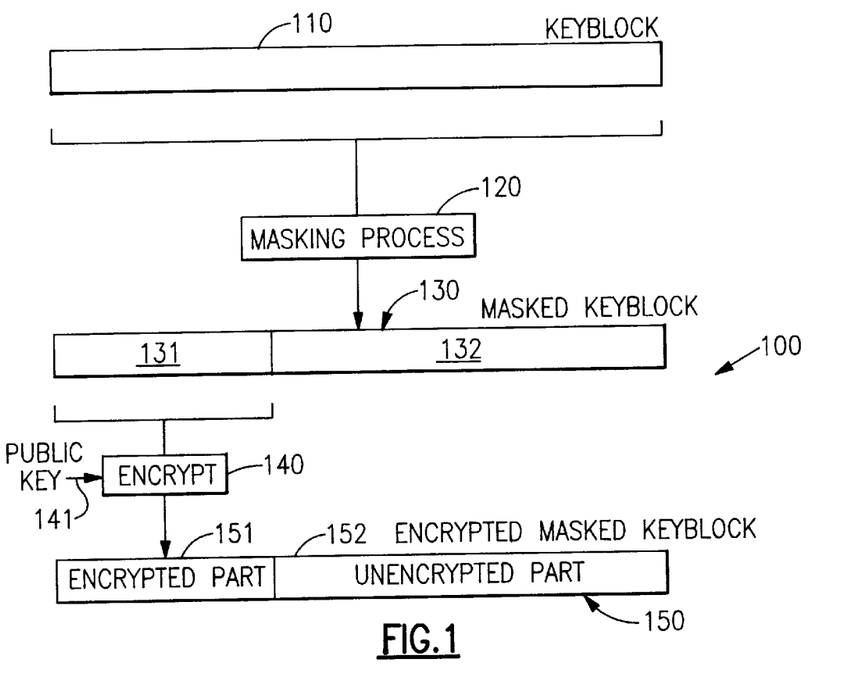
FIG. 1 is a schematic block diagram of the encryption procedure of the present invention.

FIG. 1 illustrates the general encryption procedure 100 of the present invention. Depending on the particular implementation, the functional blocks depicted in FIG. 1 and elsewhere may represent hardware elements, software code, or some combination of the two. As is usual, by "software code" is meant a program of instructions residing on a machine-readable program storage device (such as a magnetic or optical disk) that are executable by a machine (such as a server or a client workstation) to perform the described method steps. The machine and program storage devices of such a software implementation are entirely conventional and are hence not shown.

Encryption procedure 100 has as its input a long plaintext block such as the key block 110 shown. In general, key block 110 may consist of any desired data, such as a symmetric encryption key. However, key block 110 should contain a secret value (e.g., a secret DES key or a secret random number) of sufficient length to prevent exhaustion and to prevent an adversary from inverting the masking procedure to be described. For the sake of discussion it will be assumed that the secret value has enough independent bits to prevent exhaustion attacks to find its value, e.g., 128 bits. The present invention does not contemplate any particular number of bits, though, for the secret value.

The key block 110 may also contain certain fixed bits that may be required by the encryption process (e.g., setting a high order bit to zero) or required by the parsing algorithm (e.g., use of a delimiter byte). However, the key block 110 should preferably also contain other fixed or predictable bits used for non-malleability; these bits can be used to verify that the key block has been properly recovered.

Figure 5:
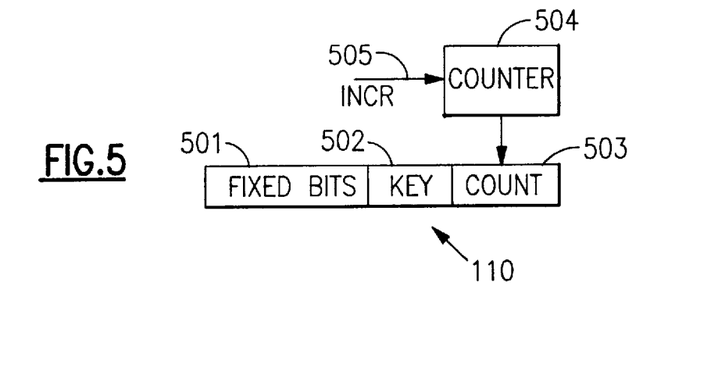
FIG. 5 is a schematic block diagram of the format of the key block.

FIG. 5 shows a possible format for key block 110. Key block 110 contains a first field 501 with fixed information to verify the recovery process, a second field 502 containing the symmetric encryption key or other secret information being conveyed to the recipient, and an optional third field 503 containing a count from a counter 504 that is incremented (505) for each encryption of a plaintext block.

Count field 503 ensures that the key block 110 is unique for each encryption of a plaintext block. Although a randomly generated number could be used for a similar purpose, using a count deterministically avoids identical key blocks 110, whereas a random number only provides a probability of avoiding identical key blocks. As an alternative to having a count in the key block 110 itself, a count may also be inserted into an additional data field, outside the key block, on which the masking transformation is optionally dependent, as described below.

Referring again to FIG. 1, in encryption procedure 100 key block 110 is first "masked", or transformed into a masked key block 130 of the same size using a masking procedure 120. Masking procedure 120, the details of which are described below, is an invertible transformation defined to have the following cryptographic properties:

1. Each bit in the masked key block 130 is a function of each and every bit in the key block 110 (i.e., there is strong intersymbol independence).

2. No bit in the key block 110 can be determined unless every bit in the masked key block 130 is known or available (excepting the case where the adversary is able to exhaust on the unknown bits of the masked key block).

The masked key block 130 produced by a masking procedure 120 having these properties can be protected by encrypting any subportion of it, as long as the key is long enough to deter an exhaustion-type attack.

A subportion 131 of the masked key block 130 is then encrypted, using a encryption procedure 140 having an encryption key 141, to generate an encrypted portion 151 of a ciphertext block 150. Preferably, encryption procedure 140 is a public key procedure, such as an elliptic curve procedure having a key (and encryption block) size on the order of 160 bits. The particulars of the elliptic curve procedure used form no part of the present invention, but are described in the references cited above. While the elliptic curve procedure is highly preferred because of its high cryptographic strength relative to its block size, in general any other public key procedure or even a private key procedure such as DES may be used instead for encryption procedure 140.

The remaining portion 152 of the ciphertext block may simply be taken from the corresponding portion 132 of the masked plaintext block 130, without encrypting it. Alternatively, all or part of the remaining portion 132 of the masked key block 130 may be encrypted as one or more blocks or subportions, using one or more keys and one or more encryption algorithms. The same data may also be multiply encrypted along an encryption pipeline, again using one or more keys and one or more encryption algorithms.

Figure 2:
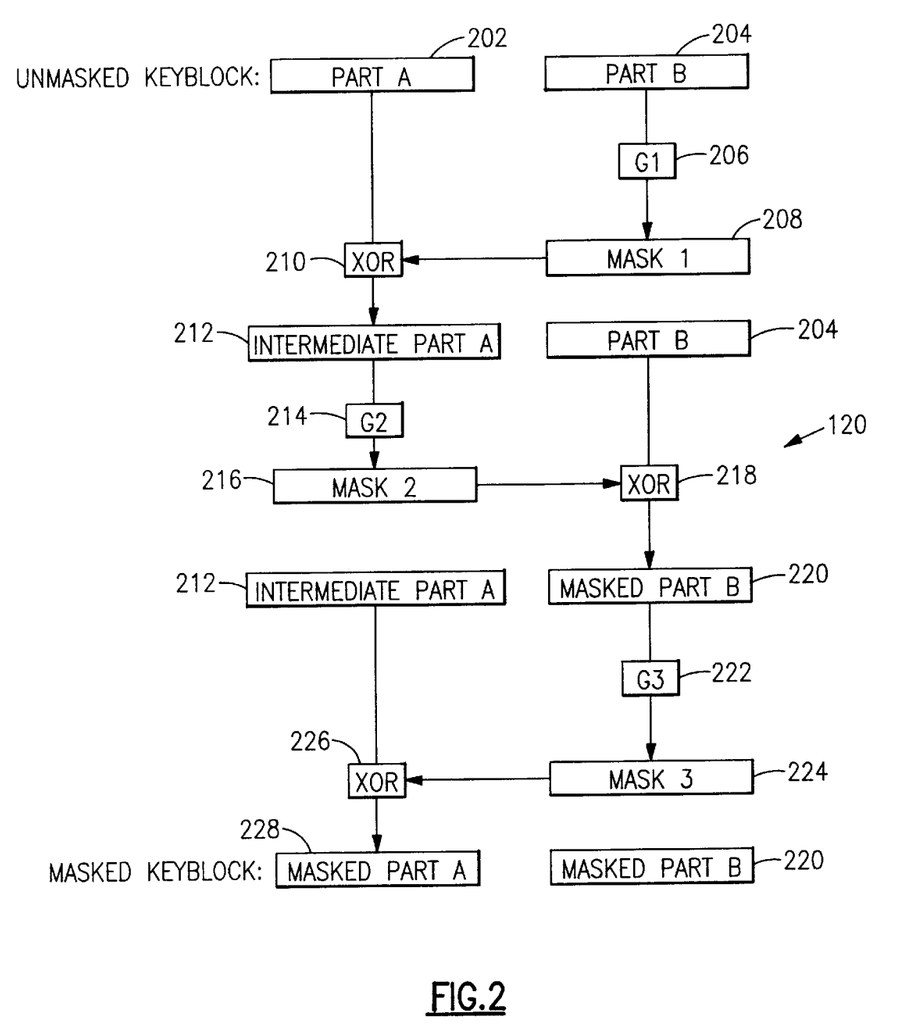
FIG. 2 is a schematic block diagram of the masking procedure used in the encryption procedure shown in FIG. 1.

FIG. 2 shows the masking procedure 120. The masking procedure first divides the key block 110 into a first part 202 (part A) and a second part 204 (part B). Although Part A is shown to the left of part B in the figure, any other scheme for assigning bits to the two parts may be used as well; the order and location of the bits is not important. Parts A (202) and B (204) may be of equal length or of different lengths. There may be security advantages, however, to having parts 202, 204 of equal or near equal length.

It is assumed that at least one of parts 202, 204 contains a secret value, such as a secret key or a secret random number. However, the secret value may also be divided with a portion in part 202 and a portion in part 204.

In general, masking procedure 120 comprises the following steps:

1. Masking part A (202) with part B (204) to generate an intermediate-stage part A (212).

2. Masking part B (204) with the intermediate-stage part A (212) to generate a masked part B (220).

3. Masking the intermediate-stage part A (212) with the masked part B (220) to generate a final masked part A (228).

4. Optionally, additional iterations of masking (not shown) if desired or needed.

Three iterations of masking are needed to make each bit in the masked key block 130 a function of each bit in the (unmasked) key block 110. Three iterations of masking, appropriately performed, should also be sufficient to make each bit in the masked key block 130 dependent on each bit in the original key block 110. This achieves complete intersymbol dependence.

The masking procedure will now be described in detail. The masking procedure 120 calculates a first mask value 208 (mask 1) on part B (204) using a first generator function (G1) 206. The length of mask 1 (208) is equal to the length of part A (202).

Mask 1 (208) is then combined (210) with part A (202) to produce an intermediate-stage part A (212). The combining operation 210 may be an Exclusive-OR (XOR) operation, i.e., bitwise modulo 2 addition, as shown. More generally, the combining operation 210 may comprise any invertible operation, such as modulo addition on n-bit blocks.

Next, a second mask value 216 (mask 2) is calculated on intermediate-stage part A (212) using a second generator function 214 (G2). The length of mask 2 (216) is equal to the length of part B (204). Mask 2 (216) is Exclusive-ORed (218) with part B (204) to produce a masked part B (220).

Finally, a third mask value 224 (mask 3) is calculated on the masked part B (204) using a third generator function 222 (G3). The length of mask 3 (224) is equal to the length of part A (202). Mask 3 (224) is Exclusive-ORed (226) with the intermediate-stage part A (212) to produce a final masked part A (228).

Each of generator functions G1–G3 is a cryptographic one-way function that calculates an n-bit output value from an m-bit input value, where m and n are input variables to the generator function. As is conventional in cryptography, by "one-way" function is meant a function whose inverse is computationally infeasible to calculate for almost any output value of the function. One possible implementation of generator functions G1–G3 would be to employ a strong cryptographic hash function H, such as the NIST Secure Hash Algorithm Revision One (SHA-1), described in FIPS Publication 180-1, Secure Hash Standard (SHS); the RSA Message Digest algorithm 5 (MD5), described in R. L. Rivest, "The MD5 Message Digest Algorithm", RFC 1321, April 1992; or the IBM Modification Detection Code algorithm (MDC-2/4), described in Brachtl et al. U.S. Pat. No. 4,908,861.

In the example below, suppose that MD5, which produces a 128-bit hash value, is used for the hash function H. As a simplifying assumption, suppose that the lengths of parts 202 and 204 are multiples of 128 bits (16 bytes). And suppose, for the sake of argument, that part A (202) consists of three 16-byte blocks and part B (204) consists of two 16-byte blocks.

Figure 3:
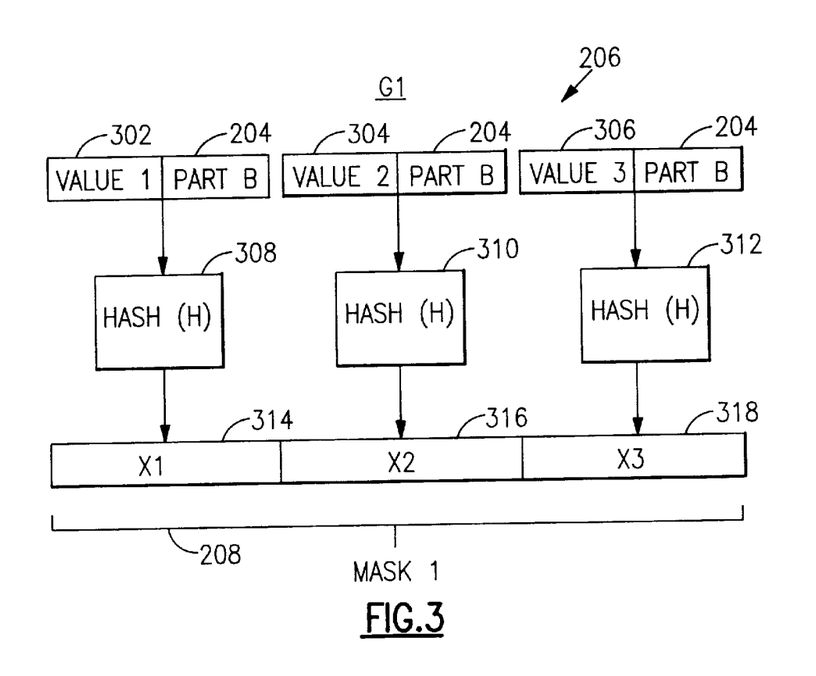
FIG. 3 is a schematic block diagram of a first generator function used in the masking procedure shown in FIG. 2.

Referring to FIG. 3, the first mask value 208 (mask 1) is calculated with function G1 (206) as follows:

1. A unique value 302 (value 1) is concatenated with part B (204), and the resulting value is hashed with H (308) to produce a 128-bit value 314 (X1).
2. A unique value 304 (value 2) is concatenated with part B (204), and the resulting value is hashed with H (310) to produce a 128-bit value 316 (X2).
3. A unique value 306 (value 3) is concatenated with part B (204), and the resulting value is hashed with H (312) to produce a 128-bit value 318 (X3).

Mask 1 (208) is defined as the concatenation of values 314, 316, 318 (X1–X3). The length of mask 1 (208) is 3×16=48 bytes, as is the length of part A (202), with which it is Exclusive-ORed.

Figure 4:
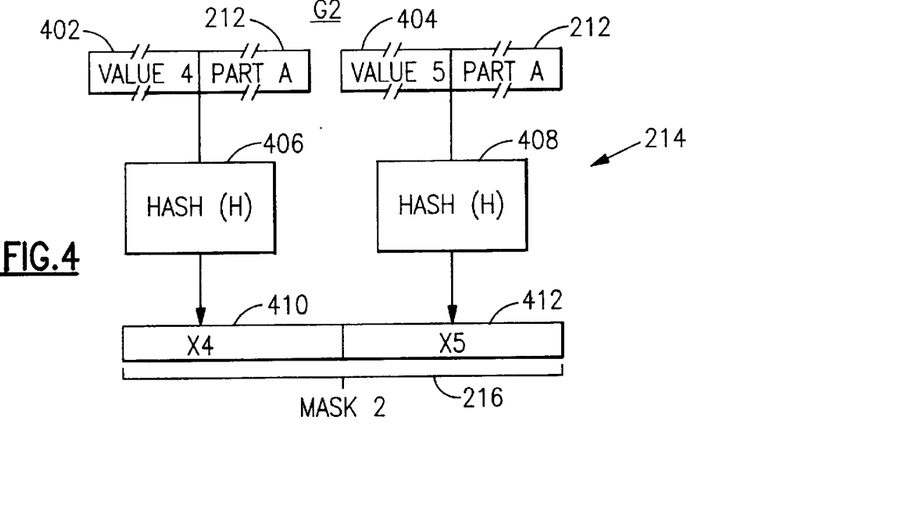
FIG. 4 is a schematic block diagram of a second generator function used in the masking procedure shown in FIG. 2.

Referring to FIG. 4, the second mask value 216 (mask 2) is calculated with function G2 (214) as follows:

1. A unique value 402 (value 4) is concatenated with the intermediate-stage part A (212), and the resulting value is hashed with H (406) to produce a 128-bit value 410 (X4).
2. A unique value 404 (value 5) is concatenated with the intermediate-stage part A (212), and the resulting value is hashed with H (408) to produce a 128-bit value 412 (X5).

Mask 2 (216) is defined as the concatenation of values 410, 412 (X4–X5). The length of mask 2 (216) is 2×16=32 bytes, as is the length of part B (204), with which it is Exclusive-ORed.

In the embodiment shown, function G3 (222) is identical to function G1 (206), the only difference between the two being that function G3 receives its input from the masked part B (220) instead of the unmasked part B (204). This is merely for efficiency of implementation, however, and in general G3 may differ from G1. Also, function G2 differs from functions G1 and G3 only because parts 202 and 204 are of different lengths. If the two parts were of the same length, then all three functions G1–G3 could be identical.

Values 302–306 and 402–404, though differing from one another, may remain the same for each invocation of functions G1–G3. Alternatively, each of these values may be altered for each successive invocation of the generator functions, using an incrementing counter or other suitable mechanism.

If the length of part 202 or 204 is not a multiple of the length of the hash function H (16 bytes in the above example), a mask value is calculated which is (1) a multiple of length of the hash function H and (2) longer than the data it is intended to mask. In that case, a subportion of the mask is Exclusive-ORed with the input data. It may also be necessary to pad the input data prior to hashing the data. But this does not materially affect the design of the generator function.

Figure 6:
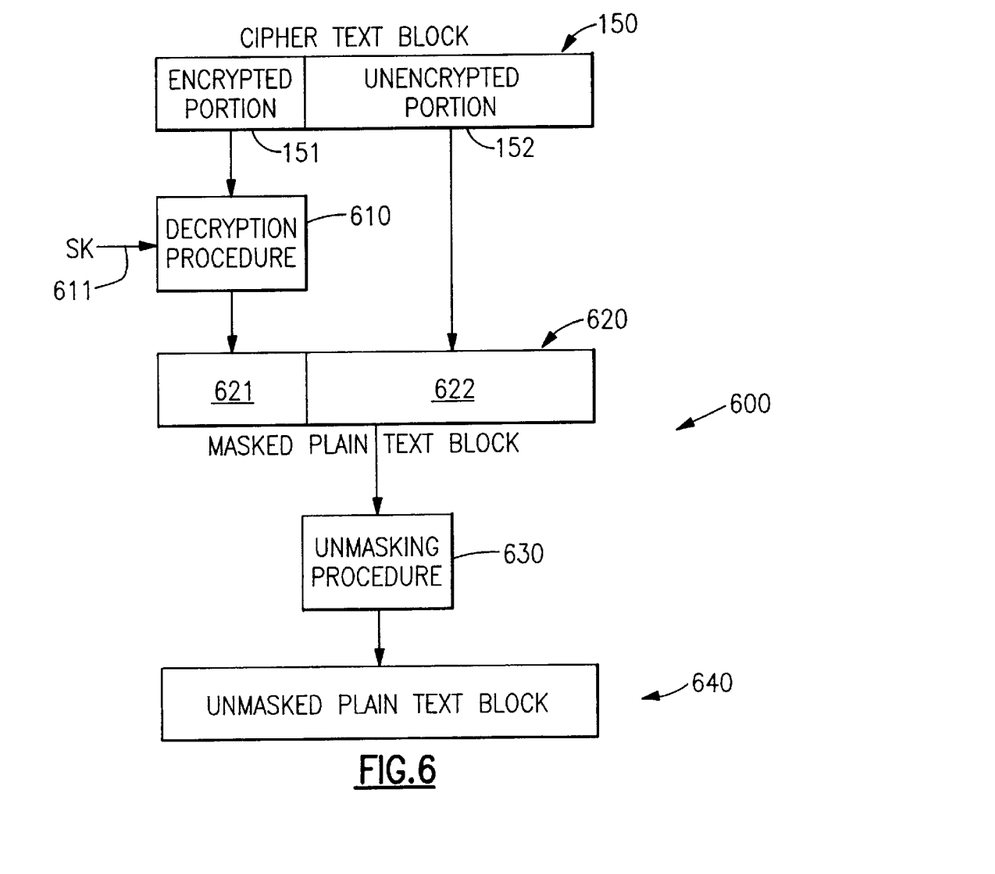
FIG. 6 is a schematic block diagram of the decryption procedure of the present invention.

FIG. 6 shows the procedure 600 used to recover the original key block from the ciphertext block 150. Procedure 600 decrypts the encrypted portion 151 of ciphertext block 150, using a decryption procedure 610, to generate the first portion 621 of a regenerated masked key block 620. Decryption procedure 610 is simply the inverse of encryption procedure 140. If encryption procedure 140 is a public key procedure having a public encryption key 141, decryption procedure 610 has a corresponding secret decryption key 611 known only to the recipient. If encryption procedure 140 is a symmetric procedure, decryption key 611 is the same as (secret) encryption key 141. The remaining portion 622 of regenerated masked key block 620 is simply taken from the remaining portion 152 of the ciphertext block 150, without alteration. An unmasking procedure 630 then transforms the regenerated masked key block 620 into an unmasked key block 640 that should match the original key block 110.

Figure 7:
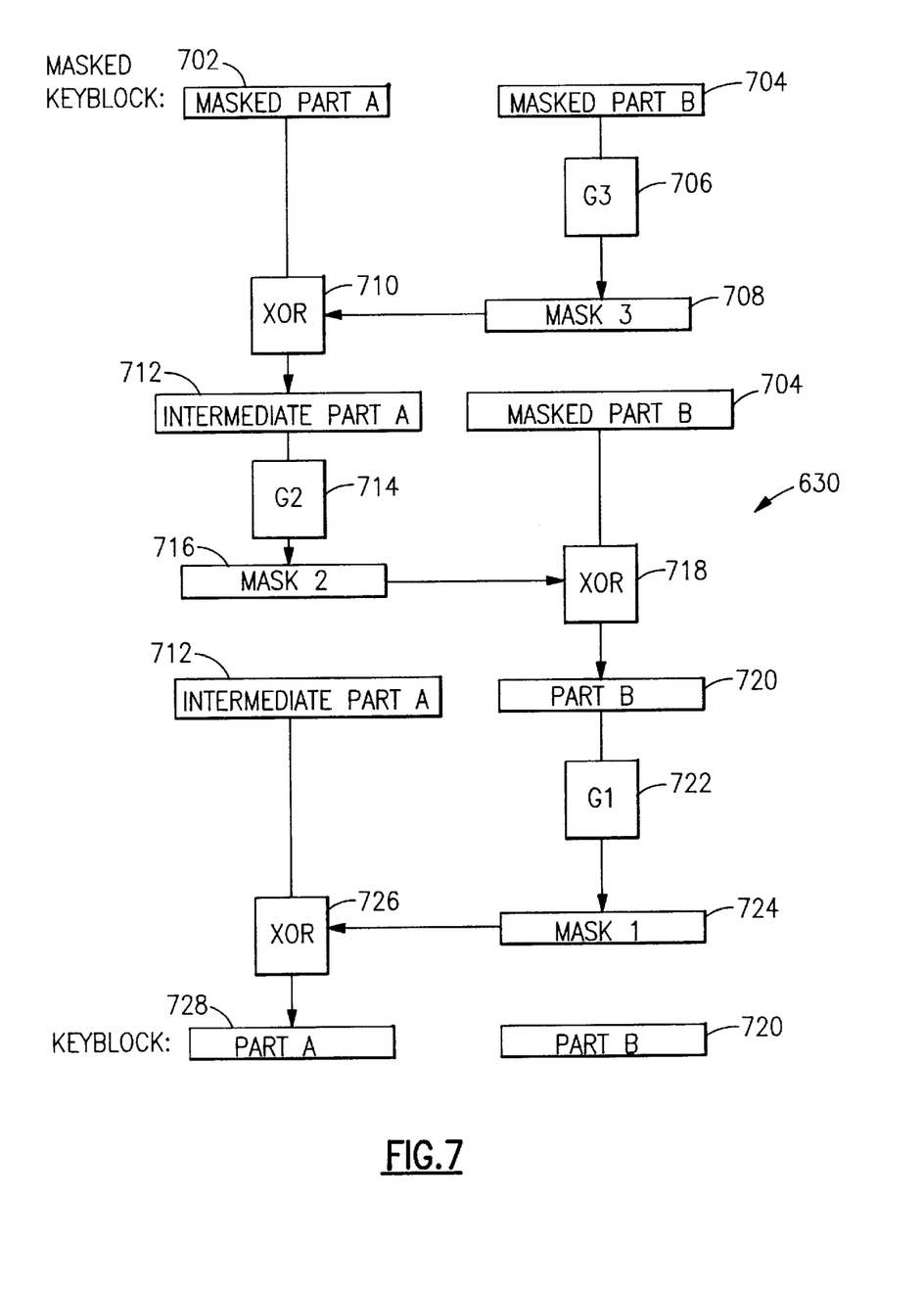
FIG. 7 is a schematic block diagram of the unmasking procedure used in the decryption procedure shown in FIG. 6.

FIG. 7 shows the unmasking procedure 630, which is simply the inverse of masking procedure 120. Procedure 630 first divides the regenerated masked key block 620 into masked parts A (702) and B (704) corresponding in length to parts 202 and 204 (FIG. 2), respectively. Procedure 630 then regenerates mask 3 (708) from masked part B (704) using generator function G3 (706). Mask 3 (708) is then combined (710) with masked part A (702) to regenerate intermediate-stage part A (712). Next, mask 2 (716) is generated from intermediate-stage part A (712) using generator function G2 (714). Mask 2 (716) is combined (718) with masked part B (704) to regenerate the original part B (720). Finally, mask 1 (724) is generated from the original part B (720) using generator function G1 (722). Mask 1 (724) is combined (726) with intermediate-stage part A (712) to produce a final unmasked part A (728).

Combining operations 710, 718 and 726 are constructed so as to reverse operations 226, 218 and 210, respectively, of the masking procedure 120. In the embodiment shown, where the combining operations in the masking procedure 120 are XOR operations, the reverse combining operations 710, 718 and 726 are also XOR operations.

If, as in the present embodiment, functions G1 and G3 are the same, the unmasking procedure 630 (FIGS. 6–7) is identical to the masking procedure 120 (FIGS. 1–4); i.e., applying the masking procedure 120 twice yields the original output. However, this is a special case and in general masking procedure 120 may differ from the inverse unmasking procedure 630.

There may be situations were one has data, such as control information, an initializing vector or a count, that one desires to associate or couple to the key but does not wish to keep in the key block itself. This can be accomplished by appending this data or a hash of this data to one of the parts into which the plaintext block is divided and calculating a mask value on the extended part. Otherwise, the method is as described above.

Figure 8:
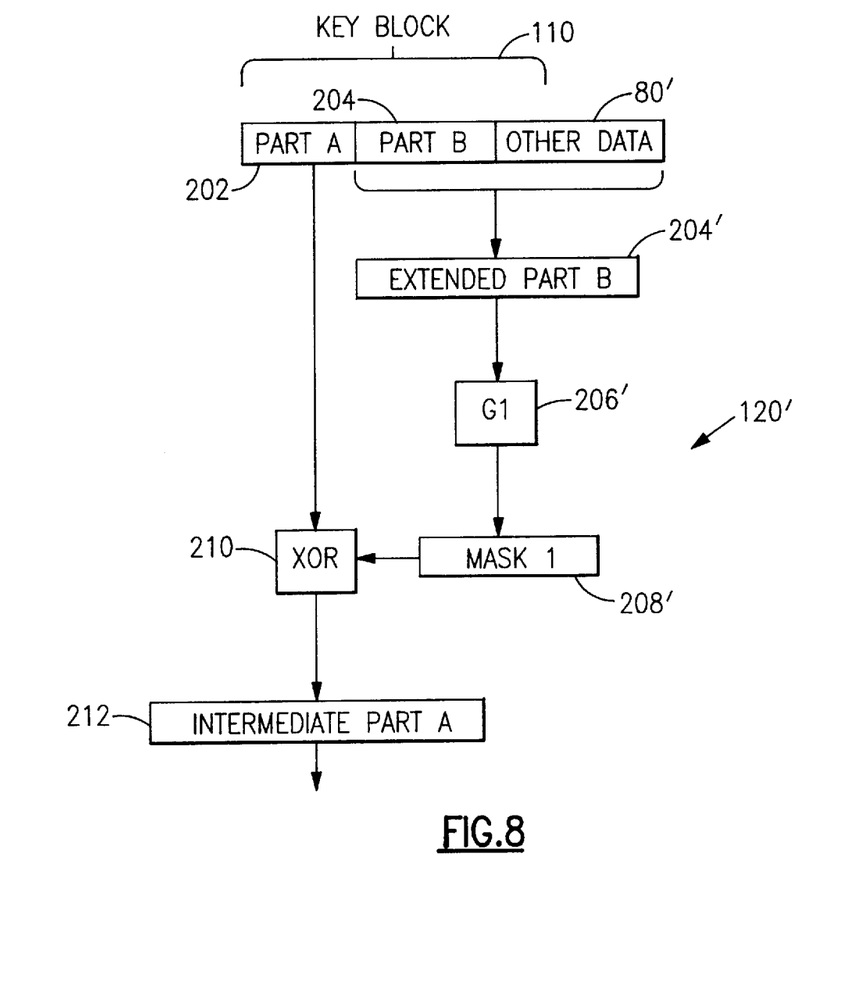
FIG. 8 is a schematic block diagram of a modified masking procedure using additional data outside the key block.

FIG. 8 shows a modified masking procedure 120' in which a modified mask 1 (208') is calculated by concatenating part B (204) with an additional data field 801 ("other data") to generate an extended part B (204'). Additional data field 801 is based upon control information, an initializing vector, a count that is incremented for each successive encryption, or other information that is available to or can be created by the recipient. The additional data field 801 may contain the information in unmodified form or may be based on a hash function of such information. Although the additional data field 801 is shown as being appended to the right of part B (204), it may also be appended to the left of part B, as may be preferable in many cases. A modified function G1 (206') responsive to the entire extended part B (204') generates a modified mask 1 (208'), which is combined (210) with part A (204) to generate a modified intermediate stage part A (212').

The remainder of the modified masking procedure 120' is identical to the masking procedure 120 depicted in FIG. 2 (except for receiving modified inputs) and hence is not shown. The unmasking procedure corresponding to the modified masking procedure 120' is similar to unmasking procedure 630, but with appropriate modifications to take account of the additional data field 801.

In the modified masking procedure 120' shown in FIG. 8, it is the first masking stage (masking part A with part B) that is modified to make the masking value dependent on the additional data field 801. Alternatively or additionally, however, either or both of the two subsequent masking stages could be modified to use the additional data field 801. Thus, either or both of generator functions G2 (214) and G3 (222) could be modified to depend on an extended key block part created by concatenating the original block part with the additional data field. In the former case, the additional data field 801 would be concatenated with part A rather than with part B to provide an input to function G2.

This modification has the advantage that the masked key block 130 is now a function of the original key block 110 and also the extra data (or hash of such data) in additional data field 801. But the extra data is not part of the key block 110 itself and so does not become masked.

As already noted, either key block 110 or the additional data field 801 (or both) should be unique for each encryption of a plaintext block. This may be accomplished by inserting a unique count in the key block 110 or additional data field 801, or by using a time stamp, random number or other mechanism as described above.

What is claimed is:

1. Apparatus for encrypting a plaintext block using a block encryption procedure, the apparatus comprising:

means for generating a masked plaintext block as a function of the plaintext block and additional data using a predetermined invertible transformation defined such that the original plaintext block is recoverable from the masked plaintext block and additional data, the masked plaintext block having the same length as the original plaintext block; and means for encrypting at least a subportion of the masked plaintext block using the block encryption procedure to generate a ciphertext block.

2. The apparatus of claim 1, further comprising:

means for uniquely modifying the additional data prior to generation of the masked plaintext block for each encryption of a plaintext block.

3. A program storage device readable by a machine, tangibly embodying a program of instructions executable by the machine to perform method steps for encrypting a plaintext block using a block encryption procedure, the method steps comprising:

generating a masked plaintext block as a function of the plaintext block and optional additional data using a predetermined invertible transformation defined such that the original plaintext block is recoverable from the masked plaintext block and optional additional data, the masked plaintext block having the same length as the original plaintext block; and encrypting at least a subportion of the masked plaintext block using the block encryption procedure to generate a ciphertext block.

4. The program storage device of claim 3, the method steps further comprising:

uniquely modifying the additional data prior to generation of the masked plaintext block for each encryption of a plaintext block.

5. A method of encrypting a plaintext data block using a block encryption procedure having a block size smaller than that of the plaintext block, the method comprising the steps of:

transforming the plaintext block into a masked plaintext block using a predetermined invertible transformation defined such that each bit of the masked plaintext block depends on every bit of the original plaintext block and no bit of the original plaintext block can be determined without having every bit of the masked plaintext block; and generating a ciphertext block by encrypting a first portion of the masked plaintext block using the block encryption procedure while leaving a second portion of the masked plaintext block unencrypted.

6. The method of claim 5, comprising the further step of transmitting said ciphertext block to a recipient.

7. A method of transmitting a plaintext block as in claim 5, comprising the further step of recovering the original plaintext block from said ciphertext block.

8. The method of claim 7 wherein said recovering step comprises the steps of:

regenerating said masked plaintext block from said ciphertext block, said regenerating step including the step of decrypting said first portion of said masked plaintext block; and regenerating the original plaintext block from the regenerated masked plaintext block by inverting said predetermined transformation.

9. The method of claim 5 wherein said block encryption procedure comprises an asymmetric encryption procedure having a public encryption key and a private decryption key.

10. The method of claim 5 in which said block encryption procedure comprises an elliptic curve procedure.

11. The method of claim 5 wherein said plaintext block comprises first and second parts, said transforming step comprising the steps of:

masking said first part with said second part to generate an intermediate-stage first part;

masking said second part with said intermediate-stage first part to generate a masked second part; and masking said intermediate-stage first part with said masked second part to generate a masked first part, one of said masked parts being used to generate a first part of said masked plaintext block, the other of said masked parts being used to generate a second part of said masked plaintext block.

12. The method of claim 11 wherein at least one of said masking steps comprises the steps of:

concatenating one of said parts with additional data outside of said plaintext block to generate an extended part; and masking the other of said parts with said extended part.

13. The method of claim 11 wherein said masked first part forms said first part of said masked plaintext block and said masked second part forms said second part of said masked plaintext block.

14. The method of claim 5 wherein said plaintext block comprises first and second parts, said transforming step comprising the steps of:

generating a first mask value from said second part using a first transformation;

combining said first mask value with said first part to generate an intermediate-stage first part;

generating a second mask value from said intermediate-stage first part using a second transformation;

combining said second mask value with said second part to generate a masked second part;

generating a third mask value from said masked second part using a third transformation; and combining said third mask value with said intermediate-stage first part to generate a masked first part, one of said masked parts being used to generate a first part of said masked plaintext block, the other of said masked parts being used to generate a second part of said masked plaintext block.

15. The method of claim 11 wherein said mask values are generated using one-way functions.

16. The method of claim 11 wherein said combining steps are performed by combining n-bit blocks using modulo addition.

17. The method of claim 16 wherein said combining steps are performed using bitwise modulo 2 addition.

18. The method of claim 5 wherein said masked plaintext block is generated as a function of said plaintext block and optional additional data, said method comprising the further step of uniquely modifying at least one of said plaintext block and optional additional data for each encryption of a plaintext block, said transforming step being performed on said modified plaintext block.

19. A method of encrypting a plaintext block using a block encryption procedure, said method comprising the steps of:

generating a masked plaintext block as a function of said plaintext block and optional additional data using a predetermined invertible transformation defined such that the original plaintext block is recoverable from said masked plaintext block and optional additional data, each bit of the masked plaintext block depends on every bit of the original plaintext block, and no bit of the original plaintext block can be determined without having every bit of the masked plaintext block;

encrypting at least a subportion of said masked plaintext block using said block encryption procedure to generate a ciphertext block; and uniquely modifying at least one of said plaintext block and said optional additional data prior to generation of said masked plaintext block for each encryption of a plaintext block.

20. The method of claim 19 wherein said plaintext block is uniquely modified prior to generation of said masked plaintext block for each encryption of a plaintext block.

21. The method of claim 19 wherein said additional data is uniquely modified prior to generation of said masked plaintext block for each encryption of a plaintext block.

22. The method of claim 19 wherein said at least one of said plaintext block and said optional additional data contains a count that is incremented for each encryption of a plaintext block.

23. The method of claim 19 wherein said at least one of said plaintext block and said optional additional data contains a time stamp that is different for each encryption of a plaintext block.

24. The method of claim 19 wherein said at least one of said plaintext block and said optional additional data contains a value that is randomly generated for each encryption of a plaintext block.

25. The method of claim 19 in which the ciphertext block is generated by encrypting a first portion of the masked plaintext block while leaving a second portion of the masked plaintext block unencrypted.

26. Apparatus for encrypting a plaintext data block using a block encryption procedure having a block size smaller than that of the plaintext block, comprising:

means for transforming the plaintext block into a masked plaintext block using a predetermined invertible transformation defined such that each bit of the masked plaintext block depends on every bit of the original plaintext block and no bit of the original plaintext block can be determined without having every bit of the masked plaintext block; and means for generating a ciphertext block by encrypting a first portion of the masked plaintext block using the block encryption procedure while leaving a second portion of the masked plaintext block unencrypted.

27. Apparatus as in claim 26 wherein said plaintext block comprises first and second parts, said transforming means comprising:

means for masking said first part with said second part to generate an intermediate-stage first part;

means for masking said second part with said intermediate-stage first part to generate a masked second part; and means for masking said intermediate-stage first part with said masked second part to generate a masked first part, said masked first part being used to generate a first part of said masked plaintext block, said masked second part being used to generate a second part of said masked plaintext block.

28. Apparatus as in claim 26 wherein said plaintext block comprises first and second parts, said transforming means comprising:

means for generating a first mask value from said second part using a first transformation;

means for combining said first mask value with said first part to generate an intermediate-stage first part;

means for generating a second mask value from said intermediate-stage first part using a second transformation;

means for combining said second mask value with said second part to generate a masked second part;

means for generating a third mask value from said masked second part using a third transformation; and means for combining said third mask value with said intermediate-stage first part to generate a masked first part, said final masked first part being used to generate a first part of said masked plaintext block, said masked second part being used to generate a second part of said masked plaintext block.

29. Apparatus for encrypting a plaintext block using a block encryption procedure, said apparatus comprising:

means for generating a masked plaintext block as a function of said plaintext block and optional additional data using a predetermined invertible transformation defined such that the original plaintext block is recoverable from said masked plaintext block and optional additional data, each bit of the masked plaintext block depends on every bit of the original plaintext block, and no bit of the original plaintext block can be determined without having every bit of the masked plaintext block;

means for encrypting at least a subportion of said masked plaintext block using said block encryption procedure to generate a ciphertext block; and means for uniquely modifying at least one of said plaintext block and said optional additional data prior to generation of said masked plaintext block for each encryption of a plaintext block.

30. The apparatus of claim 29 in which the ciphertext block is generated by encrypting a first portion of the masked plaintext block while leaving a second portion of the masked plaintext block unencrypted.

31. A program storage device readable by a machine, tangibly embodying a program of instructions executable by the machine to perform method steps for encrypting a plaintext block using a block encryption procedure, said method steps comprising:

generating a masked plaintext block as a function of said plaintext block and optional additional data using a predetermined invertible transformation defined such that the original plaintext block is recoverable from said masked plaintext block and optional additional data, each bit of the masked plaintext block depends on every bit of the original plaintext block, and no bit of the original plaintext block can be determined without having every bit of the masked plaintext block; and encrypting at least a subportion of said masked plaintext block using said block encryption procedure to generate a ciphertext block; and uniquely modifying at least one of said plaintext block and said optional additional data prior to generation of said masked plaintext block for each encryption of a plaintext block.

32. The program storage device of claim 31 in which the ciphertext block is generated by encrypting a first portion of the masked plaintext block while leaving a second portion of the masked plaintext block unencrypted.

33. A program storage device readable by a machine, tangibly embodying a program of instructions executable by the machine to perform method steps for encrypting a plaintext data block using a block encryption procedure having a block size smaller than that of the plaintext block, the method steps comprising:

transforming the plaintext block into a masked plaintext block using a predetermined invertible transformation defined such that each bit of the masked plaintext block depends on every bit of the original plaintext block and no bit of the original plaintext block can be determined without having every bit of the masked plaintext block; and generating a ciphertext block by encrypting a first portion of the masked plaintext block using the block encryption procedure while leaving a second portion of the masked plaintext block unencrypted.

34. A method of encrypting a plaintext block using a block encryption procedure, the method comprising the steps of:

generating a masked plaintext block as a function of the plaintext block and additional data using a predetermined invertible transformation defined such that the original plaintext block is recoverable from the masked plaintext block and additional data, the masked plaintext block having the same length as the original plaintext block; and encrypting at least a subportion of the masked plaintext block using the block encryption procedure to generate a ciphertext block.

35. The method of claim 34 wherein the plaintext block comprises first and second parts, the generating step comprising the steps of:

masking the first part with the second part to generate an intermediate-stage first part;

masking the second part with the intermediate-stage first part to generate a masked second part; and masking the intermediate-stage first part with the masked second part to generate a masked first part, one of the masked parts being used to generate a first part of the masked plaintext block, the other of the masked parts being used to generate a second part of the masked plaintext block.

36. The method of claim 35 wherein at least one of the masking steps comprises the steps of:

concatenating one of the parts with additional data outside of the plaintext block to generate an extended part; and masking the other of the parts with the extended part.

37. The method of claim 34, comprising the further step of:

uniquely modifying the additional data prior to generation of the masked plaintext block for each encryption of a plaintext block.

* * * * *